United States Patent [19]

Ferenczi et al.

[11] Patent Number: 5,917,731

[45] Date of Patent: Jun. 29, 1999

[54] PROCESS FOR DETECTING COMPLETE SEQUENCES AND FAILED SEQUENCES IN A SITUATION RECOGNITION SEQUENCE

[75] Inventors: Marc Ferenczi, Paris; Pascal Pares, Suresnes; Christine Grossetete, Paris, all of France

[73] Assignee: Bull S.A., Louveciennes, France

[21] Appl. No.: 08/970,618

[22] Filed: Nov. 14, 1997

Related U.S. Application Data

[63] Continuation of application No. 08/509,297, Jul. 28, 1995, abandoned.

[30] Foreign Application Priority Data

Jul. 29, 1994 [FR] France .................................. 94 09425

[51] Int. Cl.$^6$ ..................................................... G06G 7/48
[52] U.S. Cl. .......................... 364/578; 706/45; 706/914; 395/500; 607/27
[58] Field of Search .................................... 364/515, 578; 395/500; 706/45, 52, 914, 920; 607/27

[56] References Cited

U.S. PATENT DOCUMENTS

| 4,965,743 | 10/1990 | Malin et al. .............................. 364/513 |
| 5,157,620 | 10/1992 | Shaar ...................................... 364/578 |
| 5,305,454 | 4/1994 | Record et al. ........................... 395/650 |
| 5,327,490 | 7/1994 | Cave ....................................... 379/216 |
| 5,431,691 | 7/1995 | Snell et al. ................................ 607/27 |

OTHER PUBLICATIONS

IJCAI–93. Proceedings Of The Thirteenth International Joint Conference On Artificial Intelligence, Proceedings Of International Joint Conference On Artificial Intelligence, Chambery, France Aug. 28–Sep. 3, 1993, 1993, San Mateo, CA, USA, Morgan Kaufmann Publishers USA, pp. 166–172, Dousson C Et Al "Situation Recognition Representation and Algorithms" *pp. 166–172*.

AAAI–92. Proceedings Tenth National Conference On Artificial Intelligence, San Jose, CA, USA, Jul. 12–16, 1992, 1992, Menlo Park, CA, USA AAAI Press, USA, pp. 735–740, Dorn J "Temporal Reasoning in Sequence Graphs" *pp. 735–740*.

Auomation and Remote Control, vol. 52, No. 5, May 1991 AURCAT ISSN 0005–1179, pp. 711–718, Dvoenko S D "Recognition of a Sequence of Events on a Finite Interval" *pp. 711–718*.

Proceedings Of The 5th Jerusalem Conference On Information Technology (JCIT). Next Decade In Information Technology (CAT. No. 90TH0326–9), 0–8186–2078–1, 1990, Los Alamitos, CA, USA, IEEE Comput. Soc, USA, pp. 774–780, Belfer A Et Al "A Combinatorial Approach to Temporal Reasoning" *pp. 774–780*.

Primary Examiner—Emmanuel L. Moise
Attorney, Agent, or Firm—Kerkam, Stowell, Kondracki & Clarke, P.C.; Edward J. Kondracki

[57] ABSTRACT

The invention relates to a process of detecting check sequences in a situation recognition system, composed of a list of events and time constraints. For each check sequence, a sequence of events and intervals between possible dates of occurrence of each of these events is created in memory. The process manages an internal clock differing from universal time, representing the current date of the system, updates the sequences of events for each situation upon each occurrence of a new event. This causes an updating of the current date, an updating for each sequence of events memorized of the intervals between possible dates of occurrences, detection of all the sequences of events for which one of these intervals is empty, creation of new sequences of events integrating this new event, and a detection of complete sequences.

13 Claims, 5 Drawing Sheets

SITUATION: VERIFY TEMP RISE

EVENTS e1 : *TEMP RISE LIP : RANK = *1

*TEMP RISE LIP : GENERATRIX = *2

= *TEMP RISE LIP : / START e2 : *TEMP RISE STAVE : RANK = *1

*TEMP RISE STAVE : GENERATRIX = *2

= *TEMP RISE STAVE : / START e3 : *TEMP RISE REFRACTORY : RANK = *1

*TEMP RISE REFRACTORY : GENERATRIX = *2

= *TEMP RISE REFRACTORY : / START

CONSTRAINTS c1    0 mm <= e2 - e1 <= 15mm c2    0 mm <= e3 - e1 <= 15mm

WHEN ABORTED PRINTF ( "CHECK %\n", KNAME OF (*TEMP RISE LIP ))
WHEN RECOGNIZED PRINTF ( "SUCCESS ATTAINED %\n, KNAME OF (*TEMP RISE LIP ))

FIG. 3C

PROCESS FOR DETECTING COMPLETE SEQUENCES AND FAILED SEQUENCES IN A SITUATION RECOGNITION SEQUENCE

This is a continuation of Ser. No. 08/509,297 filed Jul. 28, 1995 now abandoned.

FIELD OF THE INVENTION

The present invention relates to a process for detecting check sequences in a situation recognition system. The objective of such a system is a temporal analysis of programming by situation, making it possible to oversee and monitor the development, over time, of a set of facts of a knowledge base.

BACKGROUND OF THE INVENTION

Present industrial tools, designed for continuous analysis of a process in real time, are poorly adapted to cases in which it is necessary to identify significant events in the course of the process observed, and to take into account the temporal relations between these events and make inferences about them.

For certain of these tools, the events overseen are analyzed relative to the past, which necessarily requires the archiving of a large quantity of information. Although this atemporal treatment suffices in certain cases, it is inadequate as soon as real-time recognition of sequences of events and knowing whether they meet time constraints is involved.

Other systems enable the detection of events by a series of tests repeated constantly over the course of time. The weakness of this approach is that these tests take place indefinitely after the delays fixed by the time constraints have passed. This inevitably reduces the overall efficiency of such systems.

SUMMARY OF THE INVENTION

The object of the present invention is to overcome the disadvantages of archiving and the required memory size in the known systems, by enabling detection as soon as possible of Complete Sequences and above all of Failed Sequences, that is, sequences of events which completely meet a given Situation, without knowing whether any event can meet these requirements. Once these sequences are detected, the required actions follow automatically, and they can be destroyed, thus freeing up the memory space occupied and unburdening the processing system.

This object is attained by a process for detecting failed sequences in a situation recognition system including at least one situation, composed of a list of events and of time constraints linking these events, for which a sequence of events is created in memory that contains a list of events expected in this situation and intervals between dates of possible occurrence of each of these events, said intervals being initially equal to $]-\infty, +\infty[$, said process managing an internal clock that differs from universal time, representing the current date of the system, and characterized by the updating of the sequences of events for each situation upon each occurrence of a new event, this updating causing a first step of updating the current date to the date at which the new event occurred; a second step of updating, for each sequence of events memorized, of the intervals between possible dates of occurrence of events not yet recorded as a function of the time constraints and the new current date, a third step of detecting all the sequences of events for which one of these intervals is empty, these sequences being designated as failed sequences; a fourth step of creating new sequences of events integrating this new event; and a fifth step of detecting complete sequences.

Another advantage is attained in an embodiment of the process of the invention wherein that the memory occupied by a sequence of events is freed if the sequence of events is detected as being a Failed Sequence. In the same way, in a possible variant, the memory occupied by a sequence of events is freed if the sequence of events is detected as being a Complete Sequence.

In another particular feature of the process of the invention, the creation of a new sequence of events, which corresponds to the recognition of an expected event, causes the callup of a function known as Recognition, associated with the situation that corresponds to this sequence of events. In the same way, the detection of a complete sequence or the detection of a Check Sequence causes the callup of a function known as Complete or Failed, respectively, these functions are associated with the situation corresponding to that sequence of events. The advantage of this is that it allows the system running the process to initiate other actions as a function of events recorded and of the development of the situations. For example, it is thus possible to signal to the operator that a scenario is proceeding properly, or to send appropriate alarm signals.

By the process of the invention, the function known as Failed is called up only if the failed sequence is not included in any other sequence of events. In this way, the number of false alarms signaled can be reduced.

To permit management of events of which it is known that their recording can be delayed, a positive delay value can be defined for each event composing a situation, said delay expressing, in the form of a duration, a possible delay in the signaling in the occurrence of this event.

In still another variant of the process of the invention, a sixth step of calculating the dead time date, the date closest to which at least one sequence of events will have been aborted if an event that it expects does not occur before that date, is added between the third and the fourth step. This dead time date is calculated as being the minimum of the upper limits of the intervals between possible dates of occurrence of events expected by each of the sequences of events.

In a particular feature of this variant, upon each occurrence of a new event, and if the date of occurrence of the new event is later than the dead time date, the first step is replaced by a step of updating the current date to the dead time date, and the second, third and sixth steps are performed.

In still another variant of the process of the invention, the definition of the situations is accompanied by the generation of a time graph for each of the situations, this graph enables the display on a screen of the events and the time constraints linking them, with the aid of graphical objects and arcs, representing the events and the constraints, respectively, and having as their respective attributes the names assigned to the events that they represent and the time constraint intervals, and the verification of the consistency of the routes formed by the time constraints between the various expected events.

BRIEF DESCRIPTION OF DRAWINGS

Other features and advantages of the present invention will become more clearly apparent from reading the ensuing description, taken in conjunction with the drawings, in which.

DETAILED DESCRIPTION OF THE INVENTION

Attempts to theoretically model physical processes, chemical reactions, or other phenomena that accompany the majority of manufacturing processes have rarely lead to a sufficiently complete, precise model to allow a decision for completely automatic running of the process. For example, phenomena of all sorts that occur in a blast furnace are too complex and varied to enable running the metallurgical process.

Certain models, such as MMHF (the French acronym for mathematical model of the blast furnace) have been developed, but they remain partial, and as soon as perturbations occur, which happens especially in the event of poor operation, the resultant imbalances often invalidate the theoretical calculations. As a result, the conduct of the process depends on the skill accumulated by those skilled in the art in the course of their years of experience.

Recent analysis by experts has sought to assemble data in the form of a "naive" physics, in the sense that its goal is not equations but rather sets of more general and more abstract, more generic, rules. The key to a real-time system for carrying out a process resides in the capability of analysis over time of the signals measured on site where the process is carried out, detecting phenomena as soon as possible, and knowing how to analyze their spatial and temporal relations and to track their evolution.

The concept of programming by "Situation", introduced by Ghallab et al., "Managing Efficiently Temporal Relations through Indexed Spanning Trees", Proceedings of the 11th IJCAI, Detroit, 1989, pp. 1297–1303, constitutes a programmatic solution to the problem of expressing the logic of temporal on-line analysis. This type of programming is based on several fundamental concepts, such as "situations" and "sequences of events", which will be described hereinafter. The performance of the algorithms that derive from this concept depend strongly on the number of sequences managed simultaneously, and it should be noted that detecting the Failed Sequences as soon as possible makes it possible to reduce the number of concurrent sequences.

A "Situation" is defined as a scenario that puts a set of pointwise events and temporal constraints in relation to one another. It is understood that an event has no duration; it is instantaneous. A date, called date of occurrence of the event, is associated with each occurrence of an event.

The temporal constraints express the "prior" relationship between two events. It can be quantified by a time interval that represents the minimum delay and maximum delay between the dates of occurrence of the two events.

A Situation can easily be represented by a time graph. This makes it possible to clearly visualize the relationships between the series of events expected in the context of a Situation. Such a graph is described by a set of nodes and arcs, using the following conventions:

one event is associated with each node;

an arc represents the temporal relationship that links two nodes;

a set of arcs leaving a node "A" expresses a conjunction of events expected after the occurrence of an event of type "A";

a set of arcs entering a node "B" expresses a conjunction of events preceding the occurrence of an event "B".

Figure 1A:
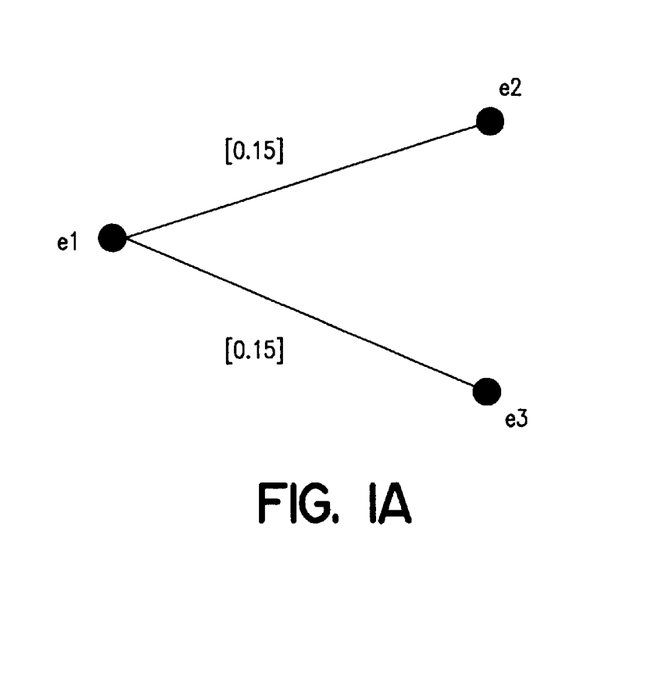
FIG. 1a is an example of a Situation time graph.

FIG. 1a shows this kind of time graph, illustrating the Situation described by the following rule, drawn from one possible application of the operation of blast furnaces:

"If there is an increase in the temperature of the lip of rank R and generatrix G, then within between 0 and 15 minutes expect an increase in the stave temperature and an increase in the temperature of a refractory of the same rank and the same generatrix."

The node 11 is the representation of the first phenomenon, hereinafter called the event e1, which starts this Situation. This involves the rise in temperature of a lip of rank R and generatrix G. The nodes 12 and 13, representing the events e2 and e3 expected in the context of this Situation, represent respectively the rises in temperature of the stave and of a refractory of the same rank and the same generatrix. These nodes are linked by arc 15 and 16, which express the time constraints linking these events. The minimal delay and maximal delay intervals, defined by the above rule, are shown in the form of a label associated with these arcs.

Figure 1B:
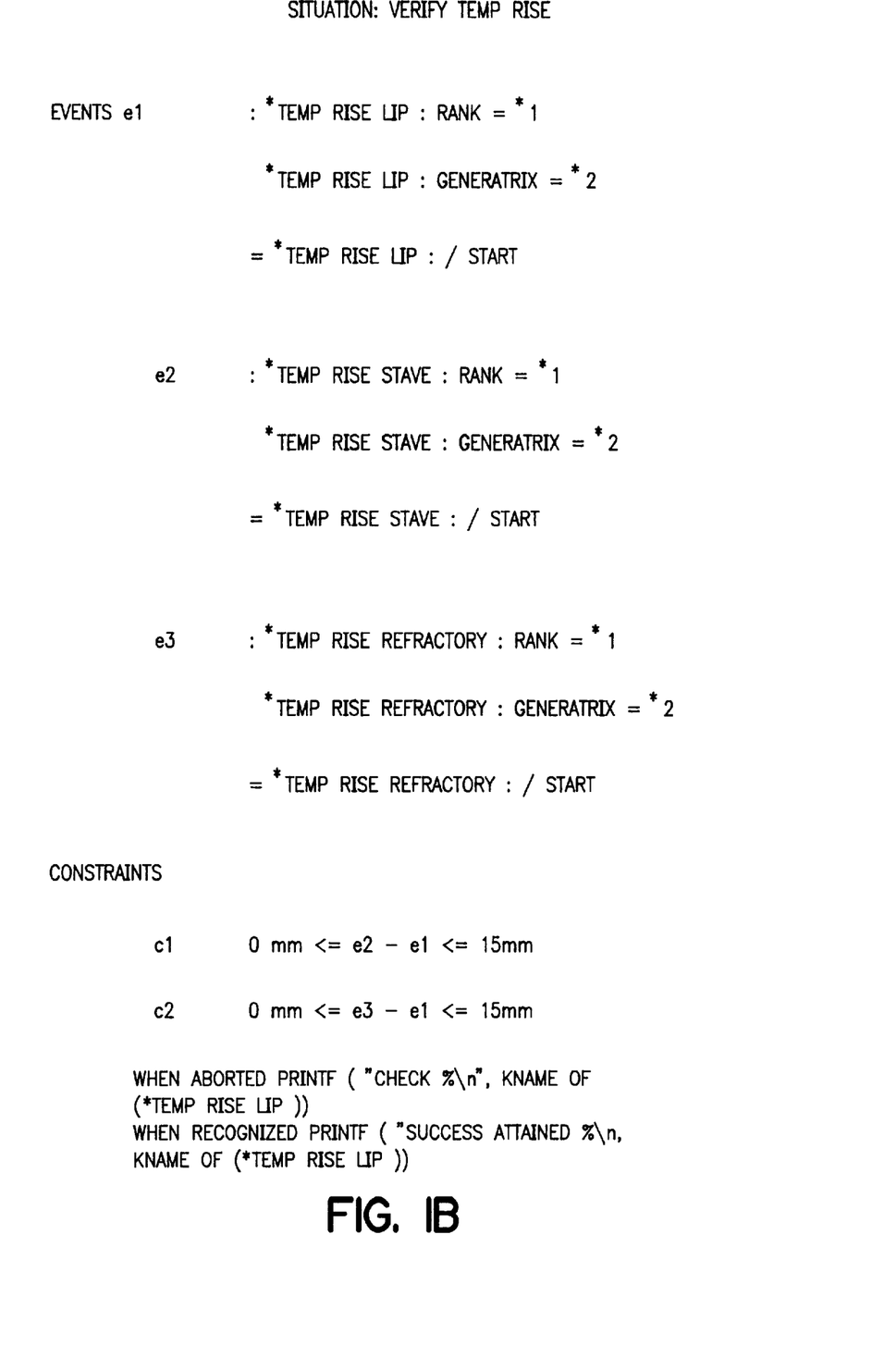
FIG. 1b is an example of a definition of a Situation in the KOOL language.

FIG. 1b is an exemplary definition of this situation in an expanded version of the knowledge representation language KOOL. This situation is named "verifyTempRise" and is composed of three events e1, e2 and e3, of the following respective type: TempRiseLip, TempRiseStave, and TempRiseRefractory, of two constraints c1 and c2 and two functions, WhenRecognized and WhenAborted, which are called upon when a Complete Sequence or a Failed Sequence, respectively, is recognized.

A "sequence of events" is the representation in memory, in the form of a data structure, of a series of occurrences of events that fully or partially meet a Situation. The sequence of events must observe the time constraints and the ordering of the events defined by a Situation. Two particular types of sequences of events can be distinguished: Complete Sequences and Failed Sequences.

A sequence is called a Complete Sequence when it completely satisfies the Situation, that is, when all the events contemplated in the description of a Situation have occurred, and within the delays imposed by the time constraints associated with these events.

A sequence that does not completely meet the situation is called a Partial Sequence. The notion of a Maximal Sequence is also introduced when a sequence is such that no other one contains it.

A sequence that is both Partial and Maximal is called a Failed Sequence, i.e., when no other occurrence of an event can complete it to completely satisfy the Situation. If a sequence, to be Maximal is required to be a Failed Sequence, there is the beneficial effect of reducing the number of false alarms, since only the sequence containing the largest number of pieces of information relating to a given Situation will trigger an action, such as a signal at a control panel, but each of the sequences are included in the largest sequence.

Taking FIG. 1a as an example, and assuming that the event e1 occurs at the date t, a sequence of events corresponding to the Situation described will not be complete unless an event e2 and an event e3 occur within the interval [t, t+15]. If one of these two events e2 or e3 has not yet occurred when the date t+15 has passed, then the sequence will be recognized as a Failed Sequence.

Figure 2:
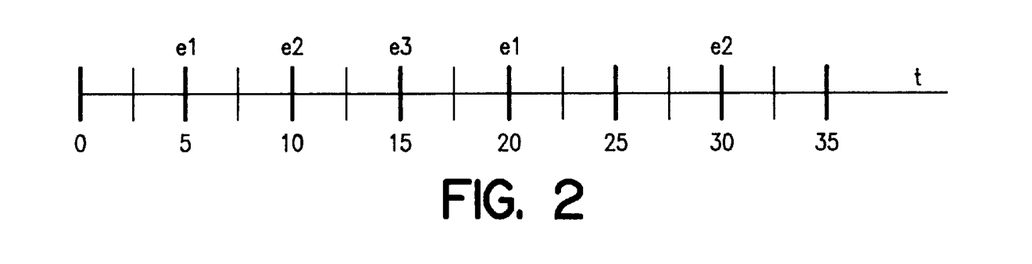
FIG. 2 shows an example of a succession of occurrences of events, and the corresponding sequences of events.

FIG. 2 shows a series of occurrences of events recorded in the course of time and shown on a graph at the date t=40.

In accordance with the situation described above, a Complete Sequence $S_c$ ((e1, 5); (e2, 10); (e3, 15)) and a Failed Sequence $S_e$ {(e1, 20); (e2, 30)} are detected, respectively when t=15 and t=35 have passed. In fact, at the date t=15, the event e3 comes to complete the sequence $S_c$, beginning with the date t=5 by the occurrence of e1 and the date t=10 by the occurrence of e2. Conversely, the sequence initiated at date t=20 by the occurrence of the e1 has not seen the occurrence of the events e2 and e3 before the date t=35. Since the time constraint [0, 15] has elapsed at the date t=20+15=35 that has passed, this sequence is then declared to be a Failed Sequence.

A process of temporal analysis must be capable of measuring the time. The situation recognition system has an integrated internal clock which evolves independently of universal time. This clock evolves in fact as a function of the temporal information recorded in the knowledge base, when new events occur. The current date is defined as the date most recently recorded.

This evolution of the internal time, which is distinct from universal time, has the consequence that it is possible to manage simultaneous event occurrences, and that the situation recognition system can function with either a simulated time or a time that is different relative to real events. For example, the current date will be incremented by 10 minutes, not after 10 minutes have actually elapsed but rather when the function of updating the internal clock has caused this increment, which can happen several seconds or several hours later, depending on the dated information recorded.

Once a date is recorded, the process infers the consequences of this evolution in time for the sequences memorized and detects the sequence that has then been aborted.

In such a process, it is accordingly not possible to "go back in time". To enable the management of nonchronological events, for example because routing the signals corresponding to a given event, or processing these signals, has taken a long time, the introduction of the concept of Delay is necessary.

A Delay associated with an event must be introduced at the time the corresponding Situation is defined. This is a positive value, which represents a duration, a tolerable delay in recording the occurrence of an event for verifying the time constraints associated with that event. If a definition of a 10 minute delay is assumed to be an authorized delay in the occurrence of the event e2 in the example of FIG. 1, then the system will expect the occurrence of e2 up to 25 minutes after the occurrence of e1 in order to declare the sequence a Failed Sequence (however, on the condition that e3 has occurred in the 15 minutes after the occurrence of e1).

Figure 3A:
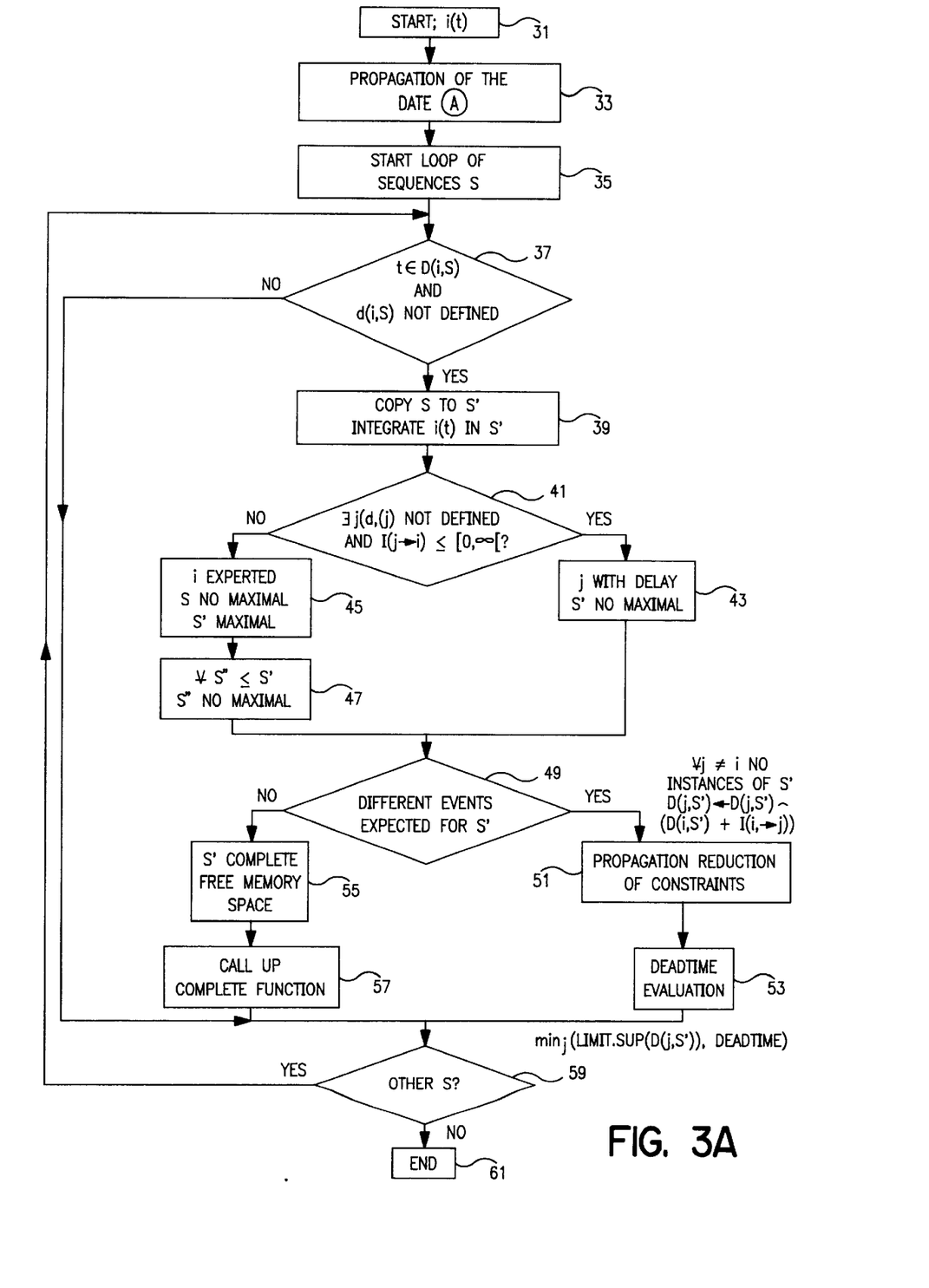
FIG. 3a–3c, in the form of flowcharts, illustrate the propagation algorithms that govern the process.
Figure 3B:
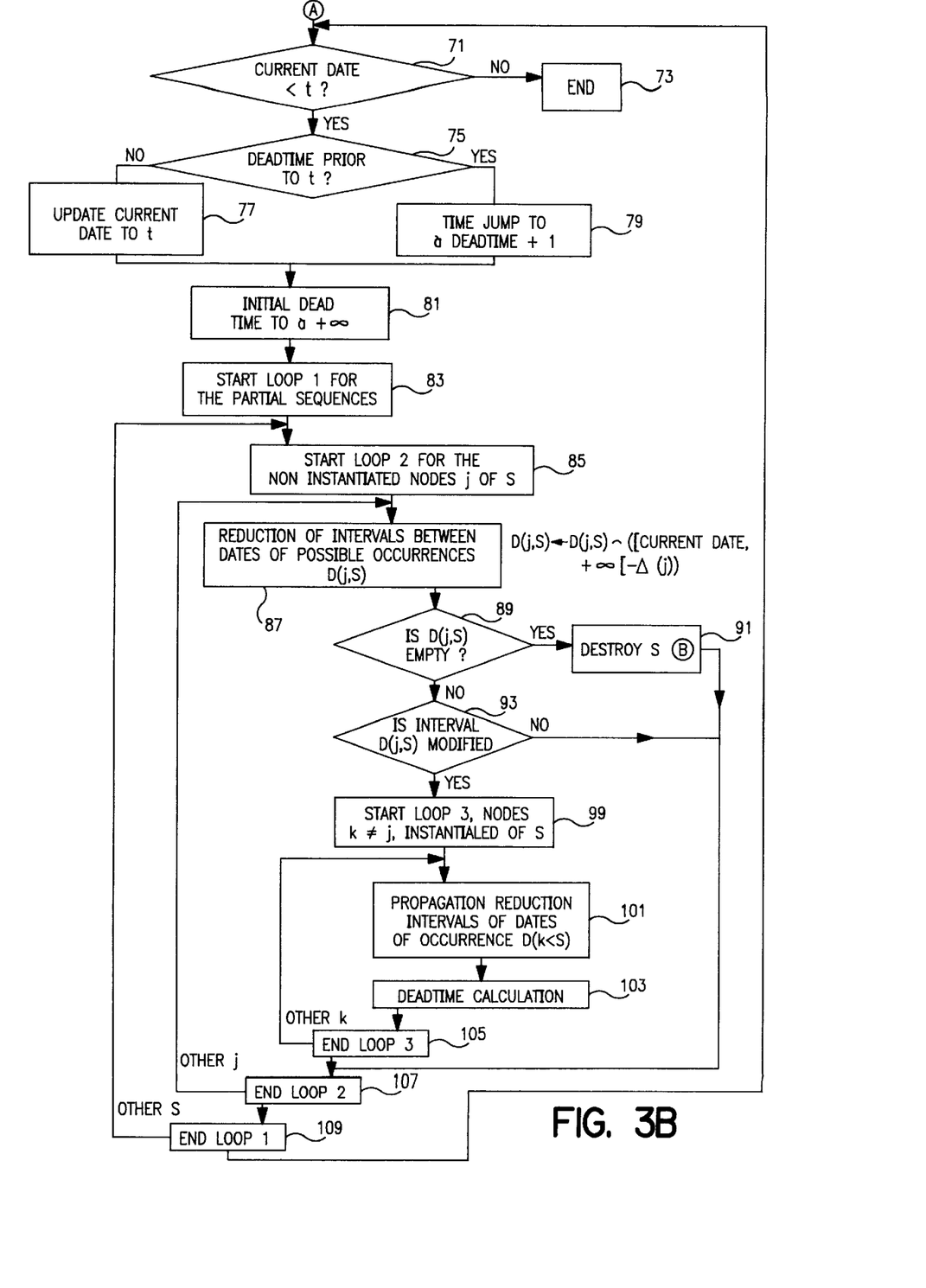
Figure 3C:
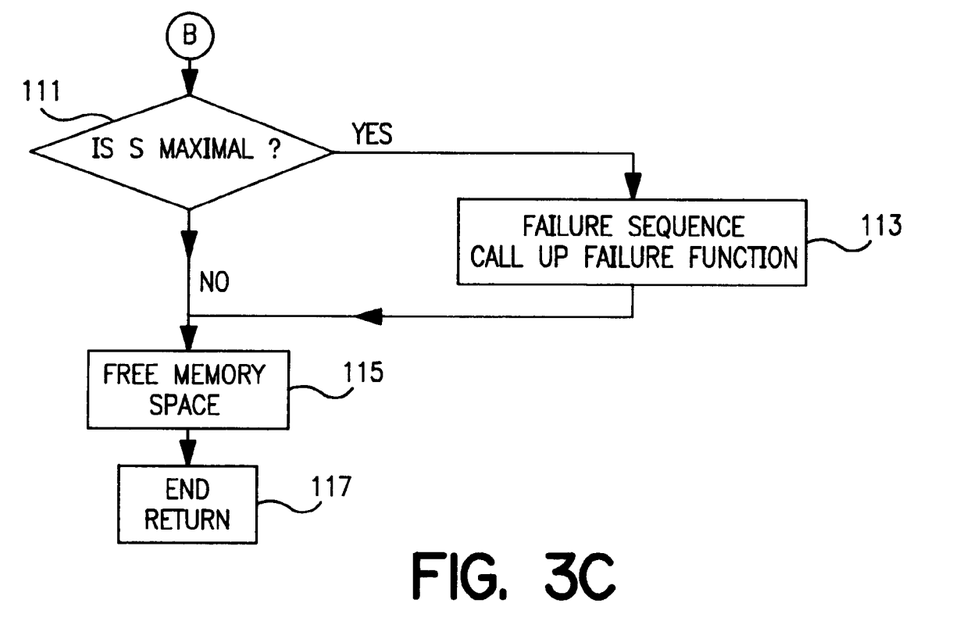

The process of the invention is described by the propagation algorithms of FIGS. 3a–3c. These involve a certain number of symbols, which have the following typographical conventions:

N designates the number of nodes (representations of events) in the time graph;

these nodes are numbered from 1 to N and designated by their number;

I(i–>j), in the form of an interval, designates the time constraint between two nodes i and j;

$\Delta(i)$ designates the interval [0$\Delta(i)$], where $\Delta(i)$ is the delay associated with i;

d(i, S) designates the date of occurrence of i, recorded in the sequence S; i is instantiated in S, if d(i, S) exists;

D(i, S), in the form of an interval, designates the possible date of occurrence of i for the sequence S; and for I and J, two time intervals, the following equations are true:

$$I=[I-, I+]$$

$$-I=[-I+, -I-]$$

$$I=\emptyset$$

if and only if $$I->I+$$

$$I+J=[I-+J-, I++J+]$$

$$I \cap J=[\max(I-, J-), \min(I+, J+)]$$

If a jump in time is made, for example on the recording of a new event, so as to detect the Failed Sequences in the chronological order in which they have been aborted, a global variable called deadtime is defined, which represents the smallest date strictly greater than the current date at which a sequence might be aborted. This variable is initialized at the value +∞. Its calculation makes it possible in a loop to perform small successive time jumps from the current date to the new date, passing through the intermediate dates at which it might have been possible to abort the sequences.

The process is based on two modes of propagating new information recorded in the knowledge base: first, the propagation of an event, which enables updating the partial sequences of events and identifying the Complete Sequences; next, the propagation of the current date, which enables identification of the Failed Sequences.

When an event occurs, the Sequences waiting for this event are duplicated. The duplicates integrate the new event and wait for following events defined in the description of the Situation with which they are associated. The original sequences remain and wait for another occurrence of this event, until they are aborted.

At the start, there is an empty initial sequence M, for which:

$$\forall i \in [1, N], D(i, M)=]-\infty, +\infty[$$

Upon each occurrence of an event i whose date of occurrence is t, the process begins at step 31 of FIG. 3a. Step 33 enables the propagation of the current date to the date of occurrence t of the event i and the detection of the failed sequences. The procedure taken will be described slightly later herein.

Step 35 indicates the start of a loop of scanning of all the Partial Sequences. In step 37, one detects whether the current Partial Sequence S is involved in the event that has occurred i. To do so, one verifies whether i is an expected event of S, whether the date of occurrence of the event i appears at the interval of possible occurrence dates D(i, S) defined by the time constraints, and that no occurrence of this event has yet been recorded at that same date t (which is equivalent to verifying that d(i, S) has not yet been instantiated). If this test proves negative, then one passes to step 59, which ends the scanning loop.

Conversely, if the event i meets the conditions of the test, the process continues at step 39, where the current Partial Sequence S is copied in memory. The occurrence of the event i is thus integrated with the copy of S, S', by instantiating d(i, S') at the value t and reducing the interval D(i, S') to [t, t].

Next, in step 41, it must be determined whether an event j exists whose occurrence was expected before that of the event i, depending on the situation S associated with S and S', and has not yet been recorded. This is expressed by a test for the existence of a node j such that the time constraint linking j to i is included within an interval [0, +∞]. This step then leads to the determination of the maximal and non-maximal sequences. In effect, if it is positive, this means that a postponement (delay) of such an event j has been authorized, and hence that the sequence S' is not maximal. A Boolean indicator that can assume the values "true" or "false", which is recorded with the information composing the sequence, is then placed at "false" in step 43 to express this fact. In the case where such a j does not exist, this indeed means that by the order provided in the definition of the situation, the event i was expected, and hence that the sequence S' is maximal, to the detriment of S, which thus can no longer exist. This is illustrated by the position of the Boolean indicator at "true" for S' and "false" for S, as indicated in step 45. This indicator is also positioned at "false for all the other sequences S" included in S' in step 47.

The next step in both cases is step 49, which seeks to determine whether other events are expected that will complete S'. If so, the time constraints linked with these expected events are reduced in step 51: for each of the nodes j not yet instantiated of S', the interval D(j, S') is reduced to the intersection of the current interval D(j, S') and the interval determined by taking the sum D(i, S') +I(i->j). Since the interval D(i, S') was initialized at [t, t] in step 39, this sum then propagates the time constraints I(i->j) that links i and j in order to count the date of occurrence t of the event i.

The next step 53 allows updating of the global variable deadtime, using the method of propagation of the current date. The date closest to that when a sequence might be aborted corresponds at minimum to the upper limits of the intervals of occurrence. Once this value is recalculated, one is at step 59, the end of the loop that began in step 35. If other unprocessed partial sequences S exist, then the loop returns to step 37 with the next partial sequence.

If in step 49 it is confirmed that no other event was expected for the sequence S', then this involves a Complete Sequence and as described in steps 55 and 57, the memory space occupied by the sequence S' can be freed and the function WhenRecognized of the associated situation can be called up. This function can then take other actions relating to the process being carried out, or can simply cause a message to be displayed on a terminal for an operator.

Once step 59 is reached, the loop goes back to step 37 in the case where partial sequences remain to be processed, or the routine is ended until the next time an event occurs.

Step 33 of propagation of the current date, which is done by a function that enables updating of the internal clock to a transmitted date and leads to the detection of Failed Sequences, will now be described in detail, referring to FIG. 3b. It begins with step 71, in which one verifies that the transmitted date t is indeed later than the current internal date. If that is not the case, the function is terminated, causing a return to step 35.

Otherwise, updating is necessary, and in step 75 a test is first made as to whether the closest date to that when a sequence might be aborted (represented by the variable deadtime) is prior to this date T. If so, one moves to step 79, where a time jump is made from the current date to the date deadtime+1, which is the first discrete date after deadtime. Otherwise, the current date is updated to the date t in step 77. This principle, by means of a feedback loop, makes it possible to update the current date to the date t, while being sure to detect possible Failed Sequences that might have been aborted at intermediate dates, in chronological order.

Regardless of the progression over time, by successive jumps or directly to the date D, the next step 81 makes it possible to reinitialize the global variable deadtime to +∞. Next, a first loop is begun for all the partial sequences S, in step 83. In step 85, a second loop is begun for the noninstantiated nodes j of each partial sequence S. Next, in step 87, the reduction of the intervals of the possible dates of occurrence of these nodes j, D(j, S) is done by intersection of the current interval for this node and an interval defined by] current date, +∞[ from which the delay defined for this node Δ(j) is drawn. This operation consists of reducing the interval D(j, S) by its lower limit, taking into account the authorized delay.

Step 89 then determines whether this interval D(j, S) is empty. If the answer is yes, it involves a sequence for which the constraint at the node j has elapsed, and the sequence can be destroyed in step 91. The detail of that step is shown in FIG. 3c. Step 111, with the aid of a test of the value of the Boolean indicator, makes it possible to verify whether the current sequence S is maximal, in which case it involves a Failed Sequence. The function WhenAborted, if it exists, is then called up. In all cases this sequence S has become useless, and the memory space that it occupied can be freed up. It should be noted that the Partial Sequences included in a Failed Sequence, which hence are not maximal, will all be detected and automatically destroyed, without causing false alarms. Once this sequence is destroyed, the propagation method continues at 107.

In the converse alternative, the interval D(j, S) is not empty, but in step 93 a test is made as to whether it has nevertheless been modified by the reduction step 87. If not, a jump is made to step 107. Conversely, if the reduction has been made, then this reduction is propagated to the other noninstantiated nodes k of S. To do so, a loop is begun at these nodes k in step 99, and this loop includes steps: a first step, 101, consisting of propagating the reduction of the interval D(j, S) to the intervals of possible occurrence dates of the nodes k with the aid of the time constraints I(j->k):

$$D(k, S) \leftarrow D(k, S) \cap (D(j, S) + I(j \rightarrow k)),$$

and a second step, 103, performing the calculation of the closest date later than the current date at which a Partial Sequence might be aborted. This possible failer date corresponds to the smallest of the upper limits of the intervals of possible occurrence dates for all the nodes k, hence the expression:

$$\text{deadtime} \leftarrow \min(\text{limit\_sup}(D(k, S)), \text{deadtime}).$$

The result of this calculation makes it possible to assure oneself that the possible occurrence of a Failed Sequence between the current date and the date t will be verified, with the aid of a time jump in accordance with steps 75 and 79.

This loop at k ends at step 105 with a return to step 101 for each noninstantiated node k of S that is different from j. When all the nodes k have been examined, one moves to step 107, which ends the second loop with a return to step 87 for each noninstantiated node j of S. Once all the nodes j have been examined, the next step, step 109 performs the return to step 85 for each of the Partial Sequences S. As soon as the propagation has been accomplished for all the sequences S, step 109 causes a return to step 71.

In this way, each time a new event i dated t occurs, the propagation of the current internal date and of the occurrence of the event by this process makes it possible to eliminate the aborted and complete sequences, which accordingly no longer burden the system memory, and this can all be done while avoiding tripping false alarms.

Further modifications within the competence of one skilled in the art are also within the spirit and scope of the invention.

What is claimed is:

1. A process for detecting failed sequences in a situation recognition system, including at least one situation, said situation comprising a list of events and time constraints linking these events, for which a sequence of events is created in a memory that contains a list of events expected in the situation, and intervals between possible dates of occurrence of each of these events, said intervals being initially equal to $]-\infty, +\infty[$, said process managing an internal clock that differs from universal time, representing the current date of the system, said process comprising:

updating the sequences of events for each situation upon each occurrence of an event, said updating causing:

updating the current date to the date at which the event has occurred;

updating, for each sequence of events memorized, the intervals between possible dates of occurrence of events not yet recorded as a function of the time constraints and the new current date;

detecting all the sequences of events for which one of the intervals is empty, said sequences of events for which one of the intervals is empty being designated as failed sequences;

creating new sequences of events integrating the new event; and detecting complete sequences.

2. The process of claim 1, wherein the memory occupied by a sequence of events is freed when the sequence of events is detected as being a failed sequence.

3. The process of claim 1, wherein the memory occupied by a sequence of events is freed when the sequence of events is detected as being a complete sequence.

4. The process of claim 1, wherein the creation of a new sequence of events, corresponding to the recognition of an expected event, causes callup of a function known as Recognition, associated with the situation that corresponds to said new sequence of events.

5. The process of claim 1, wherein the detection of a complete sequence of events causes callup of a function known as Complete, which is associated with the situation corresponding to said complete sequence of events.

6. The process of claim 5, wherein a function known as Failed is called up only when the failed sequence is not included in any other sequence of events.

7. The process of claim 6, wherein said date comprises a dead time date, wherein said dead time date is calculated as being the minimum of the upper limits of the intervals between possible dates of occurrence of events expected by each of the sequences of events.

8. The process of claim 7, wherein upon each occurrence of a new event, when the date of occurrence of the new event is later than the dead time date, the step of updating the current date to the date at which the new event occurred is replaced by a step of updating the current date to the dead time date, and the steps of updating the intervals, detecting the sequences of events for which one of the intervals is empty and calculating a dead time date are performed.

9. The process of claim 1, wherein the detection of a failed sequence causes callup of a function known as Failed, which is associated with the situation corresponding to said sequence of events.

10. The process of claim 1, wherein a positive delay value is defined for each event comprising a situation, said delay expressing, in the form of a duration, a possible delay in the signaling in the occurrence of this event.

11. The process of claim 1, further comprising a step of calculating a dead time date, a date closest to which at least one sequence of events will have been aborted when an event that is expected does not occur before said date.

12. The process of claim 1, wherein the definition of the situations comprises generating a time graph for each of the situations, said time graph enabling:

displaying, on a screen, the events and the time constraints linking them, with the aid of graphical objects and arcs, representing the events and the constraints, respectively, and having respective attributes, including the names, assigned to the events that they represent and the time constraint intervals; and verifying consistency of routes formed by the time constraints between the various expected events.

13. The process of claim 12, wherein the step of generating said time graph includes generating a set of nodes and a set of arcs, wherein:

one event is associated with each node;

an arc represents the temporal relationship that links two nodes;

a set of leaving arcs leaving a first given node expresses a conjunction of events expected after the occurrence of an event of a first type corresponding to said first given node; and a set of arcs entering a second given node expresses a conjunction of events preceding the occurrence of an event of a second type corresponding to said second given node.

* * * * *

UNITED STATES PATENT AND TRADEMARK OFFICE
CERTIFICATE OF CORRECTION

PATENT NO. : 5,917,731
DATED : June 29, 1999
INVENTOR(S) : Marc FERENCZI et al.

It is certified that error appears in the above-identified patent and that said Letters Patent is hereby corrected as shown below:

ON THE TITLE PAGE:

Item [54] Title

After "AND" delete "FAILED" and insert - - CHECK - -.

Signed and Sealed this

Twenty-eighth Day of December, 1999

Attest:

Q. TODD DICKINSON

*Attesting Officer*     *Acting Commissioner of Patents and Trademarks*